(12) United States Patent
Son et al.

(10) Patent No.: US 12,725,343 B2
(45) Date of Patent: Sep. 1, 2026

(54) METHOD AND APPARATUS WITH RENDERING

(71) Applicant: SAMSUNG ELECTRONICS CO., LTD., Suwon-si (KR)

(72) Inventors: Minjung Son, Suwon-si (KR); Hyun Sung Chang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 17/752,351

(22) Filed: May 24, 2022

(65) Prior Publication Data

US 2023/0196651 A1 Jun. 22, 2023

(30) Foreign Application Priority Data

Dec. 17, 2021 (KR) ........................ 10-2021-0181970

(51) Int. Cl.

| | |
|---|---|
| ***G06T 15/00*** | (2011.01) |
| ***G06N 3/04*** | (2023.01) |
| ***G06T 15/04*** | (2011.01) |
| ***G06T 15/10*** | (2011.01) |
| ***G06T 15/50*** | (2011.01) |

(52) U.S. Cl.

CPC ............. *G06T 15/005* (2013.01); *G06N 3/04* (2013.01); *G06T 15/04* (2013.01); *G06T 15/10* (2013.01); *G06T 15/506* (2013.01)

(58) Field of Classification Search

CPC ............ G01C 21/3815; G01C 21/3867; G01C 21/3826; G01C 11/04; G06T 19/006; G06T 15/005; G06T 15/04; G06T 15/10; G06T 15/506; G05D 1/0221; G06N 3/04

See application file for complete search history.

(56) References Cited

U.S. PATENT DOCUMENTS

| | | | | |
|---|---|---|---|---|
| 8,542,231 | B2 | 9/2013 | Kaplanyan | |
| 9,013,496 | B2 | 4/2015 | Wang et al. | |
| 9,082,230 | B2 * | 7/2015 | Gautron | G06T 15/50 |
| 9,684,996 | B2 | 6/2017 | Wang et al. | |
| 9,990,762 | B2 * | 6/2018 | Ahn | G06T 15/80 |
| 10,713,838 | B2 | 7/2020 | McGuire et al. | |
| 11,561,178 | B2 * | 1/2023 | Kannan | G16H 30/40 |

(Continued)

FOREIGN PATENT DOCUMENTS

| | | |
|---|---|---|
| KR | 10-2016-0072547 A | 6/2016 |
| KR | 10-2017-0081335 A | 7/2017 |

(Continued)

OTHER PUBLICATIONS

Weier, et al. "Foveated Real-Time Ray Tracing for Head-Mounted Displays.", *Computer Graphics forum*, vol. 35, Issue 7, Oct. 2016: pp. 289-298.

(Continued)

*Primary Examiner* — Abderrahim Merouan
(74) *Attorney, Agent, or Firm* — NSIP Law

(57) ABSTRACT

A method includes generating a first rendering based on input elements of an input scene, generating a second rendering by inputting a result of the first rendering to a generative machine learning model that is based on an artificial neural network (ANN), and generating a rendered output image based on the result of the first rendering and a result of the second rendering.

20 Claims, 10 Drawing Sheets

Iter. 1 (Direct)

Iter. N

(56) References Cited

U.S. PATENT DOCUMENTS 11,610,360 B2* 3/2023 M?ller ........ G06T 15/506
11,645,833 B2* 5/2023 Madani ........ G06F 18/2155 382/132
2010/0091018 A1* 4/2010 Tatarchuk ........ G06T 15/005 345/473
2013/0335434 A1* 12/2013 Wang ........ G06T 15/506 345/581
2015/0332497 A1 11/2015 Mitev et al.
2016/0171754 A1* 6/2016 Ahn ........ G06T 15/50 345/426
2016/0321523 A1* 11/2016 Sen ........ G06V 10/774
2018/0114096 A1* 4/2018 Sen ........ G06V 10/774
2018/0144535 A1* 5/2018 Ford ........ G06T 15/005
2018/0314944 A1* 11/2018 Li ........ G06Q 30/0241
2019/0228571 A1* 7/2019 Atsmon ........ G01C 21/3815
2019/0304172 A1* 10/2019 Ha ........ G06T 15/40
2019/0318469 A1* 10/2019 Wang ........ G06N 3/08
2020/0137375 A1* 4/2020 Kroon ........ H04N 13/275
2020/0167608 A1* 5/2020 Madani ........ G06T 7/0014
2020/0311551 A1* 10/2020 Aytekin ........ G06N 3/045
2020/0363408 A1* 11/2020 Chou ........ G01N 33/54386
2020/0380652 A1* 12/2020 Olaleye ........ G06N 3/084
2020/0402204 A1* 12/2020 Huang ........ G06T 11/003
2020/0413032 A1* 12/2020 Lyubarsky ........ H04N 9/3141
2021/0027526 A1* 1/2021 Dong ........ G06N 3/045
2021/0049834 A1* 2/2021 Kale ........ G07C 5/006
2021/0125583 A1* 4/2021 Kaplanyan ........ G06N 3/088
2021/0247921 A1* 8/2021 Anderes ........ G11C 29/4401
2021/0279952 A1* 9/2021 Chen ........ G06T 17/00
2021/0325308 A1* 10/2021 Kannan ........ G01N 21/6458
2022/0138500 A1* 5/2022 Levinshtein ........ G06V 10/82 382/159
2022/0284657 A1* 9/2022 Müller ........ G06N 3/084
2022/0292669 A1* 9/2022 Cho ........ G06N 3/0475
2022/0309736 A1* 9/2022 Bigos ........ G06T 15/40
2022/0398704 A1* 12/2022 Sun ........ G06T 5/30
2022/0405587 A1* 12/2022 Rangarajan ........ G06V 10/771
2023/0078910 A1* 3/2023 Davies ........ H04N 9/3182 345/589
2024/0177408 A1* 5/2024 Park ........ G06T 15/506

FOREIGN PATENT DOCUMENTS

KR 10-2018-0048902 A 5/2018
KR 10-1970488 B1 4/2019
KR 10-2019-0112894 A 10/2019
KR 10-2108480 B1 5/2020
KR 10-2021-0030147 A 3/2021
WO WO 2020/019618 A1 1/2020

OTHER PUBLICATIONS

Kajiya "The rendering equation.", *SIGGRAPH '86: Proceedings of the 13th annual conference on Computer graphics and interactive techniques*, vol. 20, No. 4, Aug. 1986 pp. 143-150.
Bi, et al. "Deep CG2Real: Synthetic-to-Real Translation via Image Disentanglement.", *Proceedings of the IEEE/CVF International Conference on Computer Vision (ICCV)*, 2019, pp. 2730-2739.
Korean Office Action issued on Jun. 29, 2026, in counterpart Korean Patent Application No. 10-2021-0181970 (4 pages in English, 7 pages in Korean).

* cited by examiner

METHOD AND APPARATUS WITH RENDERING

CROSS-REFERENCE TO RELATED APPLICATIONS

This application claims the benefit under 35 USC § 119(a) of Korean Patent Application No. 10-2021-0181970, filed on Dec. 17, 2021, in the Korean Intellectual Property Office, the entire disclosure of which is incorporated herein by reference for all purposes.

BACKGROUND

1. Field

The following description relates to a method and apparatus with rendering.

2. Description of Related Art

Electronic devices can implement virtual reality (VR), augmented reality (AR), or mixed reality (MR) technologies. AR is a display technology that combines virtual objects or information and displays them in the real-world environment. AR has the advantage of being applied to various real environments and is a next-generation display technology adequate for a ubiquitous environment or an Internet of things (IoT) environment. AR can provide a new experience for users by combining external foreground with virtual images and can be used to deliver information more effectively and realistically.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method includes generating a first rendering based on input elements of an input scene, generating a second rendering by inputting a result of the first rendering to a generative machine learning model that is based on an artificial neural network (ANN), and generating a rendered output image based on the result of the first rendering and a result of the second rendering.

The input elements may include any one or any combination of any two or more of lighting information, geometric information and texture information of the input scene.

The generating of the second rendering may include generating feature embedding on the texture information for each segment, adding the feature embedding as a condition for the generative machine learning model, and generating the second rendering by inputting the result of the first rendering to the generative machine learning model including the condition.

The generating of the first rendering may include generating the first rendering based on a predetermined rendering equation.

The generating of the first rendering may include generating a direct illumination rendering based on the input elements.

The generating of the second rendering may include generating an indirect illumination rendering based on the generative machine learning model.

The generating of the first rendering may include generating a first direct illumination rendering a predetermined number of times, and generating a first indirect illumination rendering the predetermined number of times or less, based on the input elements.

The generating of the second rendering may include generating a second indirect illumination rendering more than the predetermined number of times based on the generative machine learning model.

The generating of the rendered output image may include generating the rendered output image by combining the result of the first rendering and the result of the second rendering.

The generating of the second rendering may include calculating a weight by applying an attention mechanism.

In another general aspect, a method includes generating a first rendering based on input elements of an input scene, generating a second rendering by inputting a result of the first rendering to a generator, generating a rendered output image based on the result of the first rendering and a result of the second rendering, discriminating a difference, between the rendered output image and a ground truth image corresponding to the result of the first rendering, by inputting the rendered output image and the ground truth image to a discriminator, and training the generator, based on an output of the discriminator, to minimize the difference between the rendered output image and the ground truth image.

The method further including training the discriminator, based on the output of the discriminator, to discriminate between the rendered output image and the ground truth image.

The ground truth image may include either one or both of a full rendering image corresponding to the result of the first rendering and a natural image.

A non-transitory computer-readable storage medium may store instructions that, when executed by a processor, cause the processor to perform the method above.

In another general aspect, an electronic device includes a processor configured to generate a first rendering based on input elements of an input scene, generate a second rendering by inputting a result of the first rendering to a generative machine learning model based on a pre-trained artificial neural network (ANN), and generate a rendered output image based on the result of the first rendering and a result of the second rendering.

The electronic device may further include a memory configured to store the generative machine learning model and instructions, wherein the processor may be further configured to generate the first rendering based on the input elements, generate the second rendering by inputting the result of the first rendering to the generative machine learning model, and generate the rendered output image based on the result of the first rendering and the result of the second rendering.

The input elements may include any one or any combination of any two or more of lighting information, geometric information and texture information of the input scene, and the processor may be further configured to generate feature embedding on the texture information for each segment, add the feature embedding as a condition for the generative machine learning model, and generate the second rendering by inputting the result of the first rendering to the generative machine learning model including the condition.

The processor may be further configured to generate a direct illumination rendering based on the input elements, and generate an indirect illumination rendering based on the generative machine learning model.

The processor may be further configured to generate a direct illumination rendering and generate an indirect illumination rendering a predetermined number of times or less, based on the input elements, and generate an indirect illumination rendering more than the predetermined number of times based on the generative machine learning model.

In another general aspect, an apparatus includes a generator configured to generate a second rendering by receiving a result of a first rendering generated based on input elements of an input scene, and a discriminator configured to discriminate a difference between a rendered output image generated based on the result of the first rendering and a result of the second rendering, and a ground truth image corresponding to the result of the first rendering.

The generator may be further configured to be trained, based on an output of the discriminator, to minimize the difference between the rendered output image and the ground truth image, and the discriminator may be further configured to be trained, based on an output of the discriminator, to discriminate between the rendered output image and the ground truth image.

Other features and aspects will be apparent from the following detailed description, the drawings, and the claims.

Figure 1A:
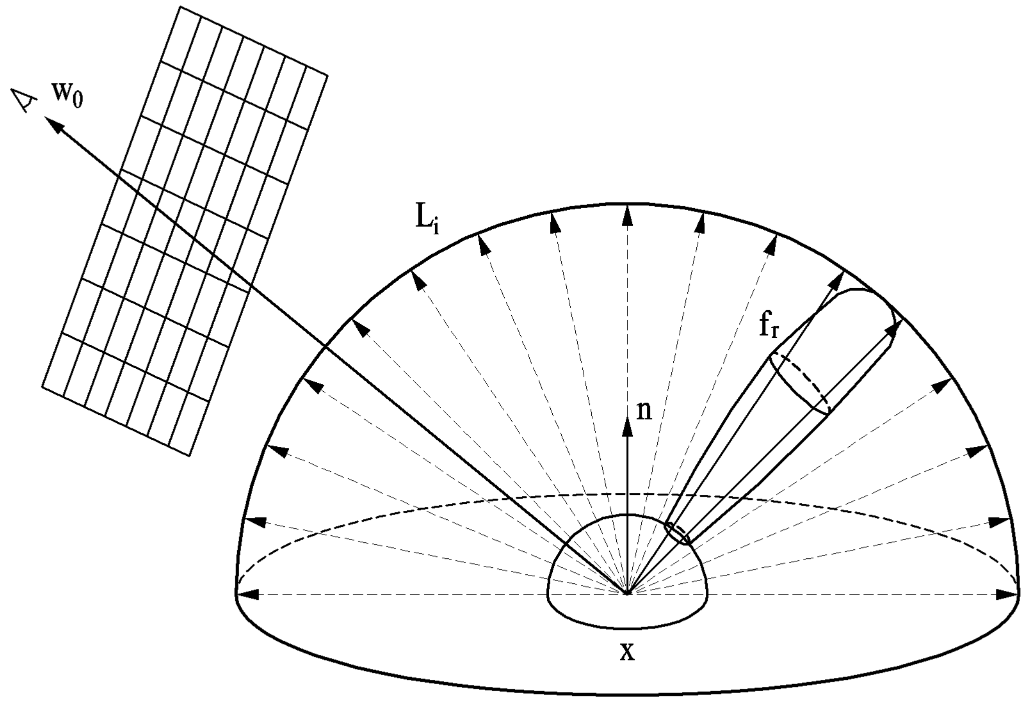
FIGS. 1A and 1B illustrate examples of a rendering equation, according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after understanding of the disclosure of this application may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The features of the examples described herein may be combined in various ways as will be apparent after an understanding of the disclosure of this application. Further, although the examples described herein have a variety of configurations, other configurations are possible as will be apparent after an understanding of the disclosure of this application.

Unless otherwise defined, all terms used herein including technical or scientific terms may have same meanings as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application, and are not to be interpreted in an idealized or overly formal sense unless expressly so defined herein.

Examples may be implemented in various types of products such as personal computers (PCs), laptop computers, tablet computers, smartphones, televisions (TVs), smart home appliances, intelligent vehicles, kiosks, wearable devices, and the like. Hereinafter, examples will be described in detail with reference to the accompanying drawings. When describing the examples with reference to the accompanying drawings, like reference numerals may refer to like components.

Figure 1B:
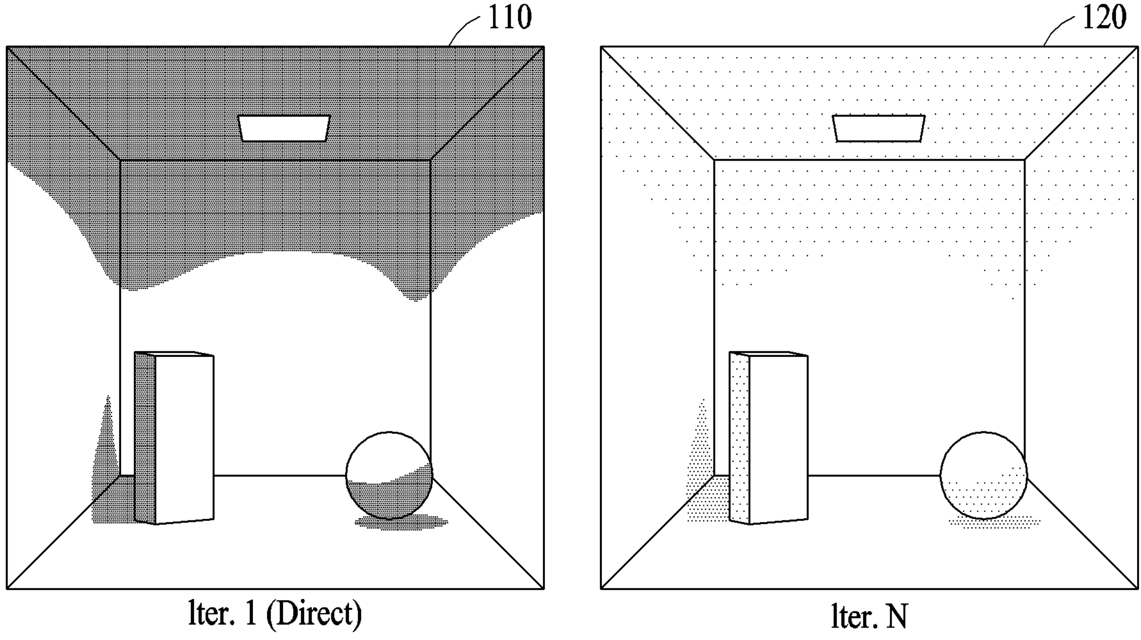

FIGS. 1A and 1B illustrate examples of a rendering equation, according to one or more embodiments.

When a person perceives an object, light reflected from points on the object is captured by the person's eyes. When displaying an object realistically, a virtual camera lens directed at the object may be regarded as a human eye, in which case, light from a light source reflected from a surface of the object into the camera may need to be considered. Ultimately, one of the fundamental tasks of a rendering may be calculating the intensity of light at each point of an image.

Referring to FIG. 1A, in an example of a rendering, a real image may be obtained by simulating a movement of photons based on lighting, geometrical properties, reflective properties, and the like in a given scene. For example, a rendering equation represented in Equation 1 may be used. Herein, it is noted that the use of the term 'may' with respect to an example or embodiment, e.g., as to what an example or embodiment may include or implement, means that at least one example or embodiment exists where such a feature is included or implemented while all examples and embodiments are not limited thereto.

Equation 1

$$\underbrace{L_o(x, \omega_o, \lambda, t)}_{\text{Observed Light}} = L_e(x, \omega_o, \lambda, t) + \int_\Omega \underbrace{f_r(x, \omega_i \rightarrow \omega_o, \lambda, t)}_{\text{Surface Reflectance}} \underbrace{L_i(x, \omega_i, \lambda, t)}_{\text{Incoming Light}} \underbrace{(\omega_i \cdot n)}_{\text{Cosign}} d\omega_i$$

The rendering equation represented in Equation 1 is a formula that may be used to calculate an amount $L_0$ of light that enters an eye at a predetermined point "x" in a predetermined direction $w_o$. λ may denote light wavelength information, and t may denote time. $L_0$ may include both an amount $L_e$ of light emitted by the point "x" as a light source and an amount (integral part) of light reflected from the point "x" and arriving at the eye after passing through other numerous points of the scene. Here, incoming light $L_i$ may be an amount of light emitted from another point in a corresponding direction.

According to Equation 1, to calculate $L_0$, direct illumination created by directly receiving light from a light source and indirect illumination created by light reflected from a surrounding object receiving the direct illumination may need to be considered. That is, Equation 1 for calculating $L_0$ may include $L_0$ at another point therein, and may include indirect illumination in which the light source continues to be reflected from the scene in addition to direct illumination in which another point is limited to the light source. To calculate this accurately, countless iterative operations that calculate the movement of photons at every point in every direction may be required.

FIG. 1B depicts an example 110 of a result obtained by performing a direct illumination rendering, without considering indirect illumination, and an example 120 of a result obtained by performing a rendering based on both direct illumination and indirect illumination by performing iterative operation "n" times. Comparing examples 110 and 120, when a calculation (e.g., example 120) is iteratively performed for a sufficient number or duration of time, a quality close to a real image may be obtained, but as it takes a lot of time, such rendering equation may be difficult to apply to applications that need to provide rendering operations in real-time. For example, in an environment where computing resources are limited, such as augmented reality (AR) glasses, it may be difficult to perform countless iterative operations in real-time.

An example of a rendering method may substitute the iterative operation of Equation 1 with a refinement network based on an artificial neural network (ANN), for example. More specifically, in the rendering method, an operation of the rendering equation of Equation 1 may be performed only a predetermined number of times (e.g., one time). Iterative operations of the rendering equation, performed a number of times greater than the predetermined number of times, may be estimated through the refinement network. Prior to describing the rendering method, the ANN will be further described with reference to FIGS. 2A and 2B.

Figure 2A:
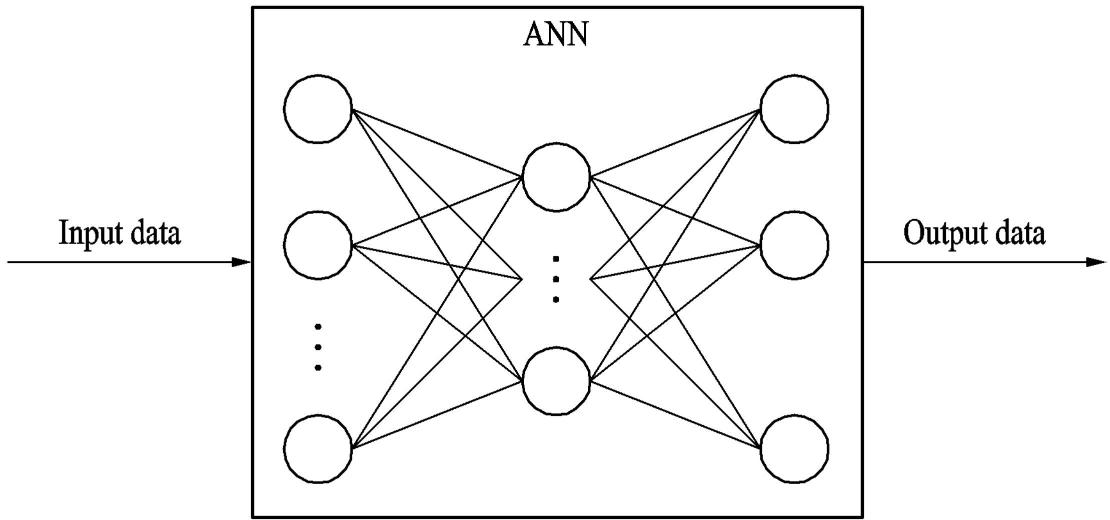
FIG. 2A illustrates an example of a deep learning operation method based on an artificial neural network (ANN), according to one or more embodiments.

FIG. 2A illustrates an example of a deep learning operation method based on an ANN, according to one or more embodiments.

An artificial intelligence (AI) algorithm, including deep learning and the like, for example, may input input data to an ANN, train the ANN based on output data through an operation such as convolution, and extract features using the trained ANN. The ANN may be a computational architecture that models a biological brain. In the ANN, nodes (or neurons) may be connected to each other and may collectively operate to process the input data. There are various types of neural networks, for example, a convolutional neural network (CNN), a recurrent neural network (RNN), a deep belief network (DBN), a restricted Boltzmann machine (RBM) scheme, and the like, however, examples are not limited thereto. In a feed-forward neural network, neurons of the neural network may have links to other neurons. Such links may extend in one direction, for example, in a forward direction, through a neural network.

FIG. 2A illustrates a structure of the ANN (e.g., a CNN) that receives input data and outputs output data, according to one or more embodiments. The ANN may be, for example, a deep neural network (DNN) including at least two layers.

A CNN, for example, may be used to extract "features" such as edges, lines, colors, and the like from input data. The CNN may include a plurality of layers. Each of the layers may receive data, process data input to a corresponding layer, and generate data to be output from the corresponding layer. For example, the data output from the layer may be a feature map generated by performing a convolution operation between a weight of a filter and an image or a feature map input to the CNN. Initial layers of the CNN may extract low-level features such as edges or gradients from an input.

Subsequent layers of the CNN may extract progressively more complex features such as eyes, nose, and the like from an image.

Figure 2B:
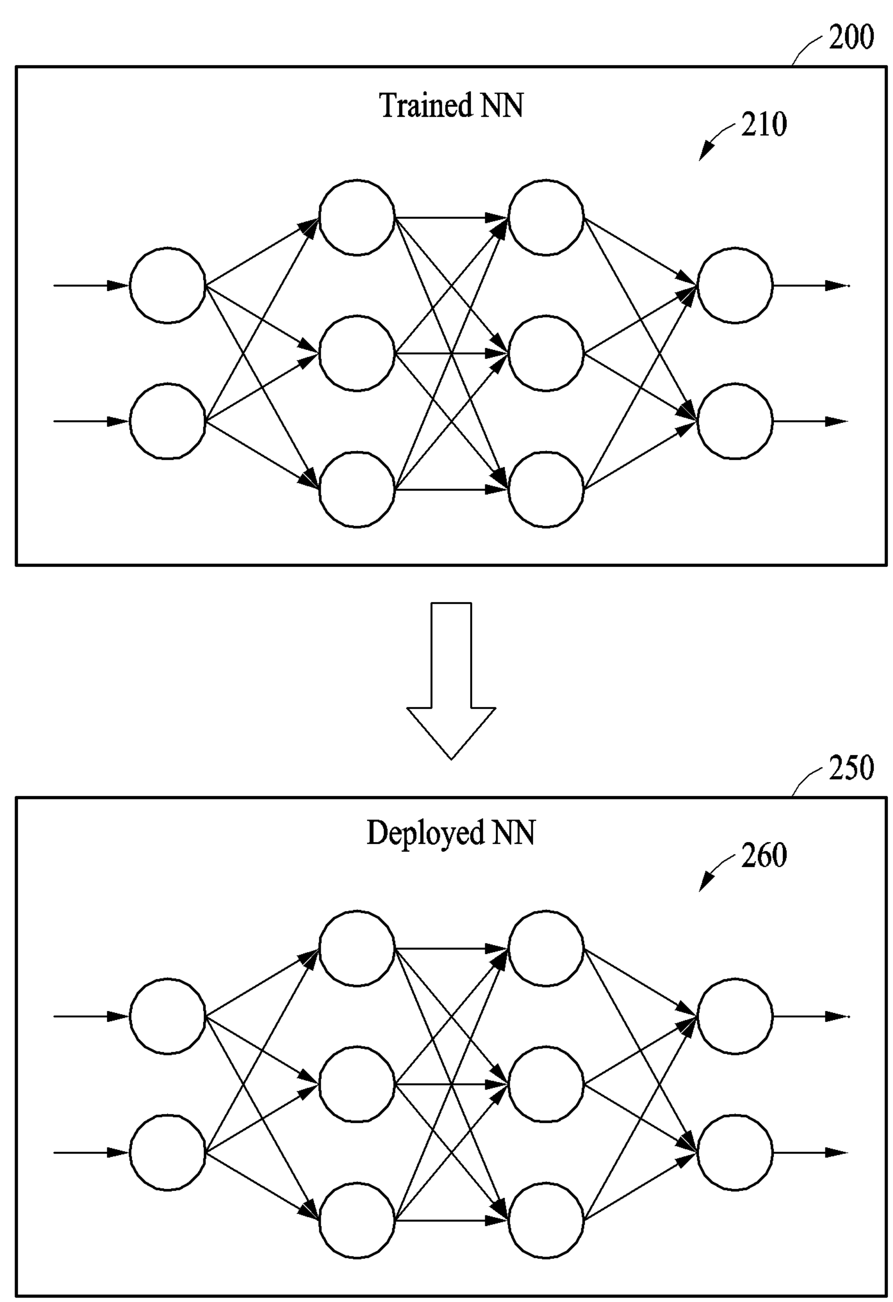
FIG. 2B illustrates an example of a rendering system, according to one or more embodiments.

FIG. 2B illustrates an example of a rendering system, according to one or more embodiments.

Referring to FIG. 2B, the rendering system may include a training apparatus 200 and a rendering apparatus 250. The training apparatus 200 may correspond to a computing device with various processing functions such as generating a neural network, training (or learning) the neural network, or retraining the neural network. For example, the training apparatus 200 may be implemented with various devices such as PCs, server devices, mobile devices, and the like.

As another example, the rendering system may be, or be included in, an electronic device that includes communication hardware to transmit, receive, and/or perform rendering. The electronic device or another electronic device may perform the rendering or communicate with the rendering system and the rendering system may perform the rendering. As another example, the rendering system may include a processor configured to perform rendering and generate a rendered output image.

The training apparatus 200 may generate a trained neural network 210 by repeatedly training (learning) a given initial neural network. Generating the trained neural network 210 may determine a neural network's parameters. Here, the parameters may include various types of data input and/or output to and/or from the neural network, such as input/output activations, weights, biases, and the like of the neural network. As repetitive training of the neural network proceeds, parameters of the neural network may be tuned to compute a more accurate output for a given input.

The training apparatus 200 may transmit the trained neural network 210 to the rendering apparatus 250. The rendering apparatus 250 may be included in a mobile device, an embedded device, and the like. The rendering apparatus 250 may be, for example, a dedicated hardware for driving the neural network.

The rendering apparatus 250 may drive the trained neural network 210 without a change, or the trained neural network 210 may drive a processed (e.g., quantized) neural network 260. The rendering apparatus 250 that drives the processed neural network 260 may be implemented in an independent device separate from the training apparatus 200. However, the examples are not limited thereto, and the rendering apparatus 250 may also be implemented in the same device as the training apparatus 200.

Figure 3A:
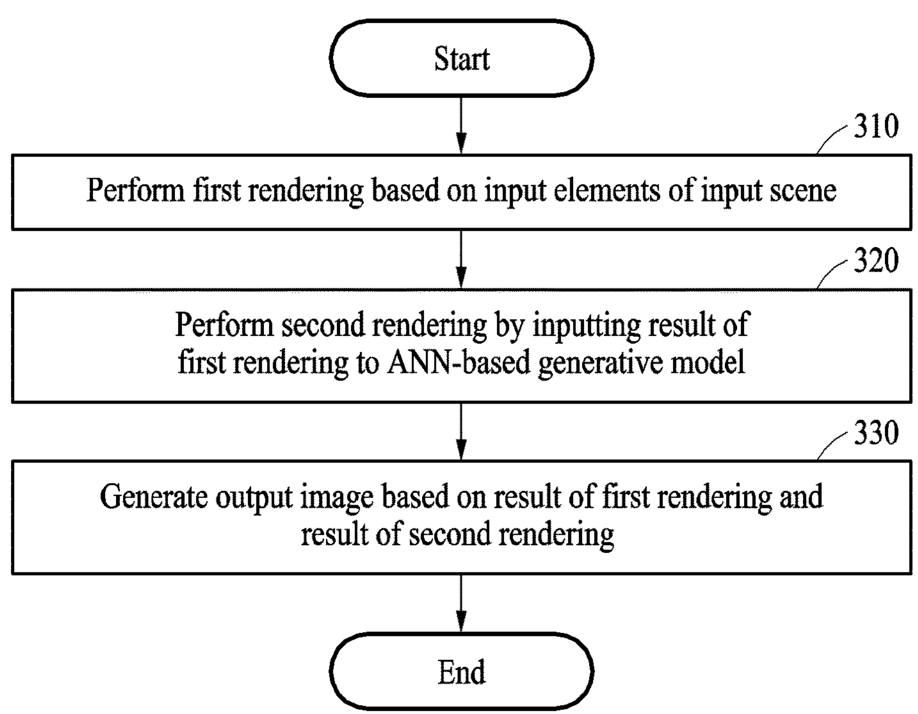
FIGS. 3A and 3B illustrate examples of a rendering method, according to one or more embodiments.
Figure 3B:
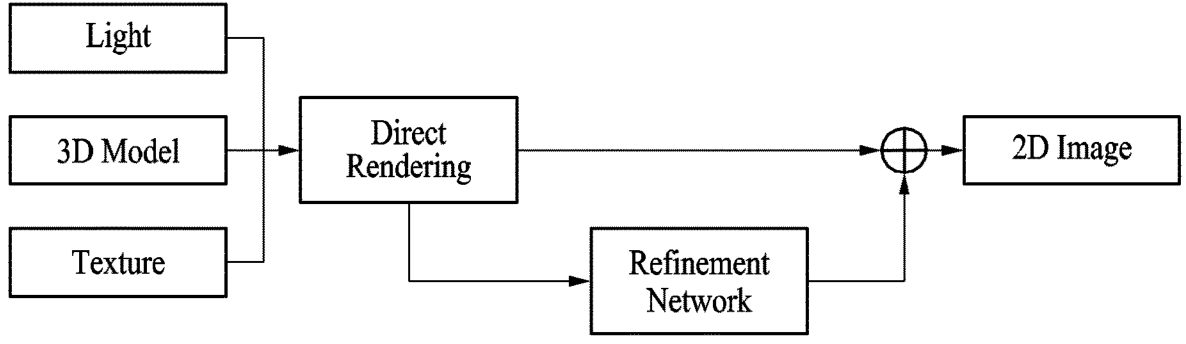

FIGS. 3A and 3B illustrate examples of a rendering method, according to one or more embodiments.

Referring to FIG. 3A, operations 310 through 330 may be performed by, for example, the rendering apparatus 250 described above with reference to FIG. 2B. Operations of FIG. 3A may be performed according to the order and method illustrated in FIG. 3A, but the order of some operations may be altered, or some operations may be omitted within the idea and scope of the examples. In addition, the operations illustrated in FIG. 3A may be performed in parallel or simultaneously.

In operation 310, a rendering apparatus may perform a first rendering based on input elements of an input scene. The input elements of the scene may include, for example, any one or any combination of lighting information, geometric information, and texture information of the scene.

The rendering apparatus may perform the first rendering based on a rendering equation represented in Equation 1, for example. For example, the first rendering may include a direct illumination rendering in which an iterative operation of Equation 1 is performed only once, or an indirect illumination rendering in which the iterative operation of Equation 1 is performed a predetermined number of times or less. That is, the rendering apparatus may perform a simple rendering through an extremely small number of iterative operations and may obtain information used for the rendering from the input elements.

In operation 320, the rendering apparatus may perform a second rendering by inputting a result of the first rendering to a generative model that is based on an ANN. The above-described refinement network may be implemented based on the generative model. For example, a training framework based on a generative adversarial network (GAN) may be used to train the refinement network to perform a desired operation. Hereinafter, an example of a training method will be further described with reference to FIGS. 4A and 4B.

The rendering apparatus may perform an operation in the rendering equation represented in Equation 1 only a predetermined number of times (e.g., one time), and may estimate iterative operations performed a number of times greater than the predetermined number of times through the refinement network. Here, a rendering corresponding to the estimated iterative operations may be referred to as the second rendering.

For example, the rendering apparatus may perform the direct illumination rendering based on the rendering equation and the indirect illumination rendering based on the refinement network. In another example, the rendering apparatus may perform the direct illumination rendering based on the rendering equation and the indirect illumination rendering a predetermined number of times or less, and may also perform the indirect illumination rendering more than the predetermined number of times based on the refinement network.

In operation 330, the rendering apparatus may generate an output image based on the result of the first rendering and a result of the second rendering. The rendering apparatus may generate the output image by adding the result of the second rendering as a residual to the result of the first rendering.

Referring to FIG. 3B, a rendering apparatus may perform a first rendering based on lighting information, geometric information, and texture information of a scene, according to one or more embodiments.

In an embodiment, the rendering apparatus may perform a second rendering by inputting a result of the first rendering to a refinement network, and may generate an output image (e.g., a two-dimensional (2D) image) by adding the result of the first rendering and a result of the second rendering.

Figure 4A:
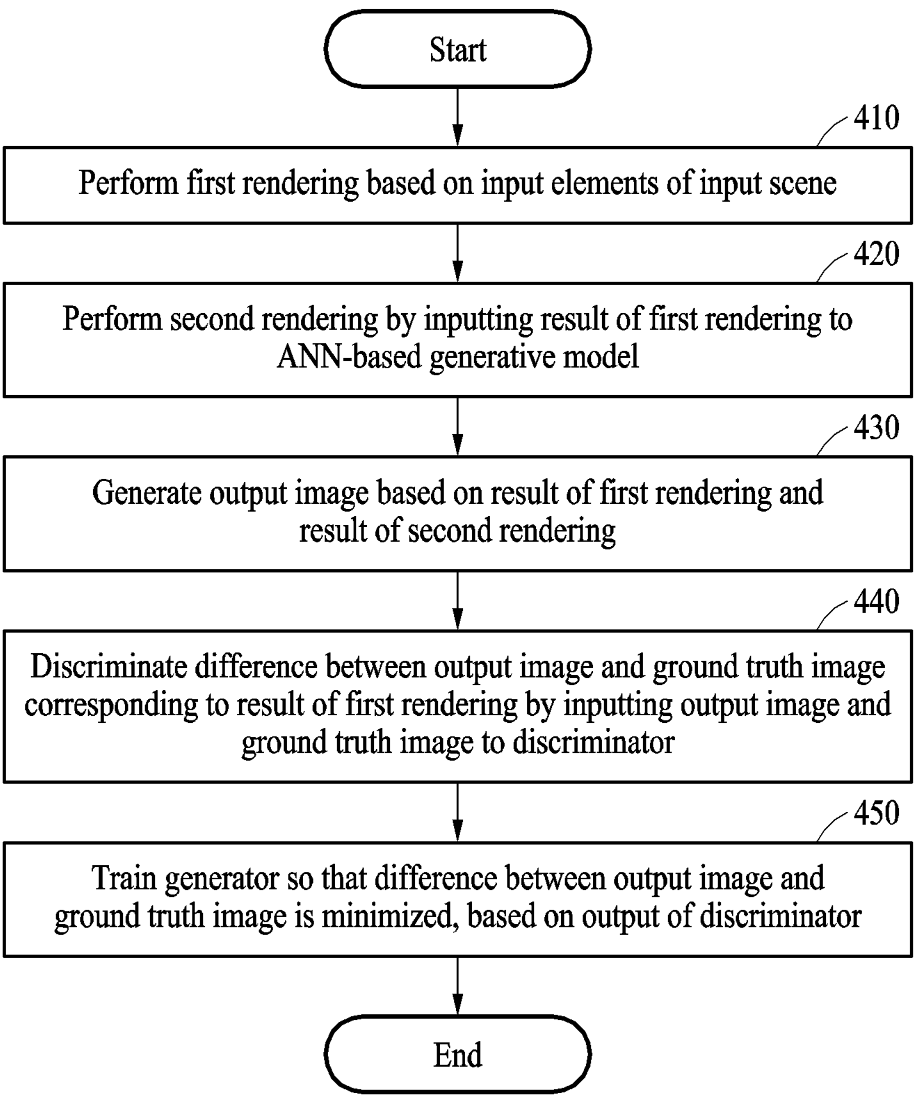
FIGS. 4A through 4C illustrate examples of a training method, according to one or more embodiments.
Figure 4B:
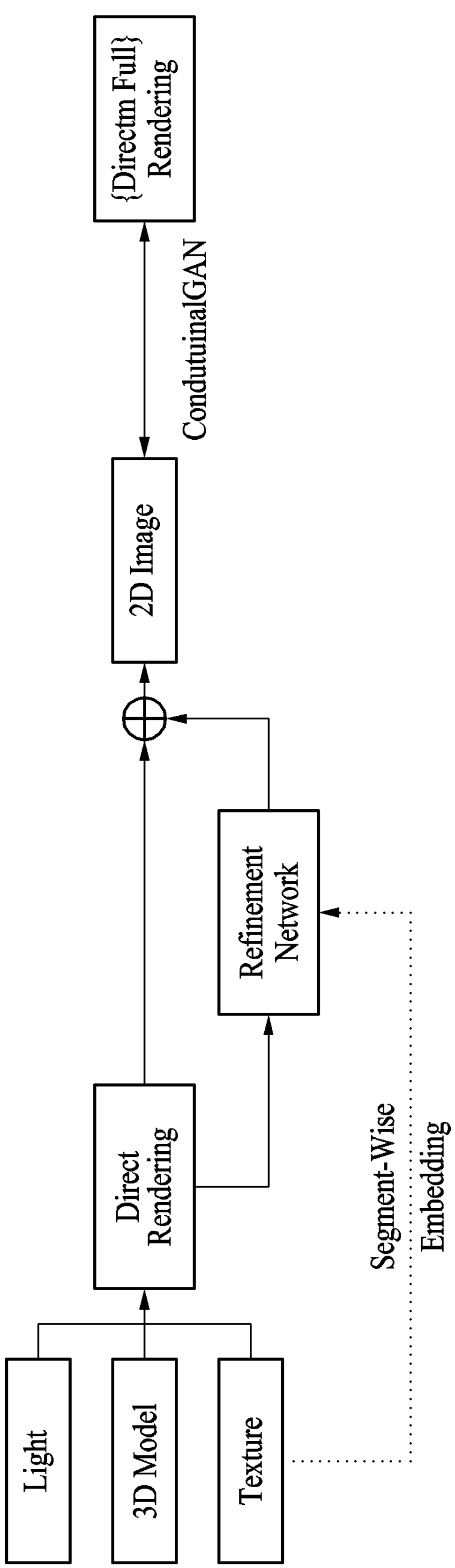
Figure 4C:
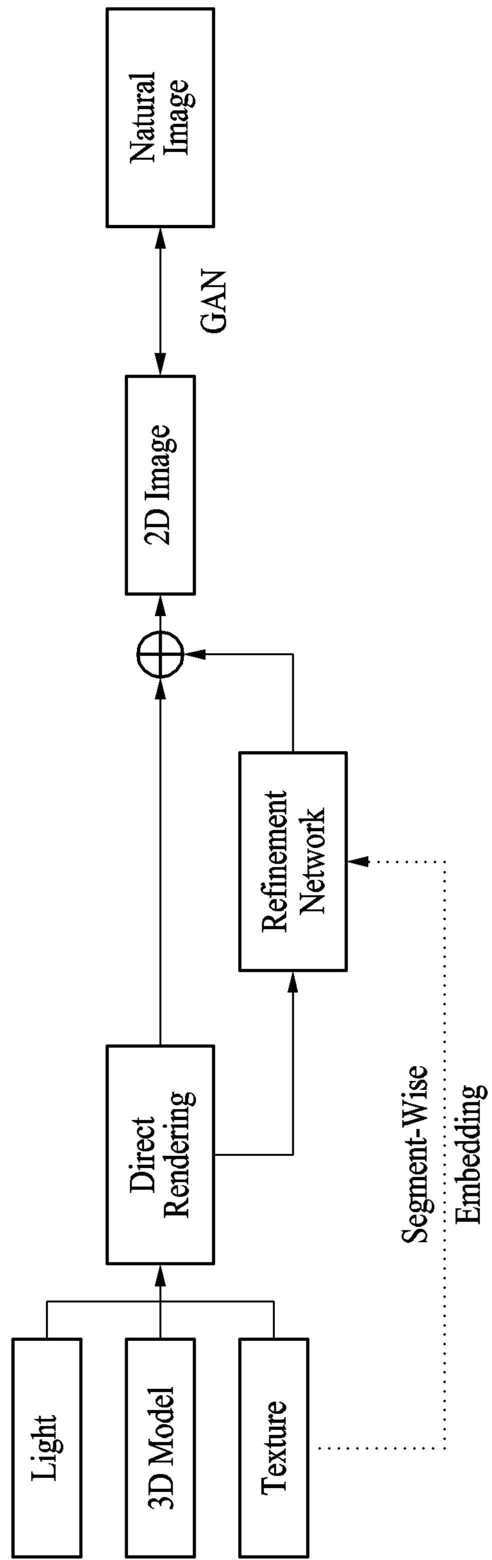

FIGS. 4A through 4C illustrate examples of a training method, according to one or more embodiments.

Referring to FIG. 4A, operations 410 through 450 may be performed by, for example, the training apparatus 200 described above with reference to FIG. 2B. Operations of FIG. 4A may be performed according to the order and method illustrated in FIG. 4A, but the order of some operations may be altered, or some operations may be omitted within the idea and scope of the examples. In addition, the operations illustrated in FIG. 4A may be performed in parallel or simultaneously.

As described above, a training framework based on a GAN may be used to train a refinement network to perform a desired operation, and the GAN may include a generator and a discriminator.

In operation 410, a training apparatus may generate a result of a first rendering based on input elements of an input scene. For example, the training apparatus may perform the first rendering based on a rendering equation represented in Equation 1.

In operation 420, the training apparatus may perform a second rendering by inputting the result of the first rendering to the generator.

In operation 430, the training apparatus may generate an output image based on the result of the first rendering and a result of the second rendering.

In operation 440, the training apparatus may input the output image and a ground truth image corresponding to the result of the first rendering to the discriminator to discriminate a difference between the output image and the ground truth image.

In operation 450, the training apparatus may train the generator so that the difference between the output image and the ground truth image is minimized, based on an output of the discriminator.

The generator may be trained to generate an output image similar to the ground truth image based on the result of the first rendering, and the discriminator may be trained to discriminate between the ground truth image and the output image generated by the generator.

When a synthetic database (DB) is used, a high-quality full rendering in which a direct illumination rendering and an indirect illumination rendering are calculated may be obtained. Accordingly, a discriminator to distinguish between a pair of direct illumination rendering and full rendering from another pair generated by the refinement network may be added, and the refinement network may be trained to deceive the discriminator.

As a result, the refinement network may simulate the indirect illumination at an approximate level to enable a realistic rendering with a small amount of computational operation. Here, a similarity with a ground truth may be used as an additional loss, if necessary.

Referring to FIG. 4B, a training apparatus may generate a result of a first rendering based on lighting information, geometric information, and texture information of an input scene. The training apparatus may perform the first rendering based on a rendering equation of Equation 1 and may perform a second rendering by inputting the result of the first rendering to a generator.

The training apparatus may generate an output image based on the result of the first rendering and a result of the second rendering, and may discriminate a difference between the output image and a ground truth image corresponding to the result of the first rendering by inputting the output image and the ground truth image to a discriminator. In addition, the training apparatus may train the generator so that the difference between the output image and the ground truth image is minimized, based on an output of the discriminator, and may train the discriminator to discriminate between the ground truth image and an output image generated by the generator.

Further, in an example, in order to provide an additional hint to a refinement network, feature embedding may be performed on input elements (e.g., texture information) for each segment. The feature embedding may be added as a condition for a generative model. Then, the training apparatus may perform the second rendering by inputting the result of the first rendering to the generative model to which the condition is added.

An indirect illumination rendering may be determined based on various elements such as a surrounding environment and the like, including a property of having continuity for each segment. Accordingly, a learning ability may be improved by performing feature embedding on texture information for each segment and adding the feature embedding as a condition to the network. A segment-wise embedding described above may or may not be applicable depending on the design of examples.

In addition, in an example, the training apparatus may use an attention-based network to consider a spatially distant location while maintaining the refinement network as light as possible. A scheme of calculating a weight by applying an attention mechanism may or may not be applicable depending on the design of examples.

Referring to FIG. 4C, it may be difficult to obtain training data of a pair of a result of a first rendering and a ground truth image corresponding to the result of the first rendering. In this example, a training apparatus may train a refinement network with a GAN setting using natural images instead of rendering images.

In this example, since it is difficult for the training apparatus to force indirect illumination to be simulated at the same level as a rendering image, a regression term that overall reduces a residual resulting from the refinement network may need to be used together. As a result, the refinement network may be trained to generate a realistic image indistinguishable from a natural image with only minimum refinement to the first rendering.

Figure 5:
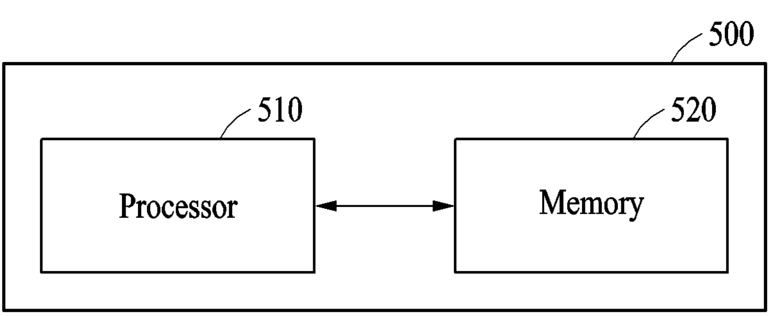
FIG. 5 illustrates an example of a configuration of a rendering apparatus, according to one or more embodiments.

FIG. 5 illustrates an example of a configuration of a rendering apparatus.

Referring to FIG. 5, a rendering apparatus 500 (e.g., the rendering apparatus 250 of FIG. 2B) may be an apparatus configured to process image data to generate reconstructed image data. The rendering apparatus 500 may include one or more processors 510 and a memory 520.

The memory 520 may store computer-readable instructions. When the instructions stored in the memory 520 are executed by the processor 510, the processor 510 may process operations defined by the instructions. The memory 520 may include, for example, a random-access memory (RAM), a dynamic random-access memory (DRAM), a static random-access memory (SRAM), or other forms of nonvolatile memories known in the art. In addition, the memory 520 may store a generative model that is based on a pre-trained ANN.

The processor 510 may control overall operations of the rendering apparatus 500. The processor 510 may be a hardware-implemented device, including a circuit having a physical structure to perform desired operations. The desired operations may include code or instructions included in a program. The hardware-implemented device may include, for example, a microprocessor, a central processing unit (CPU), a graphic processing unit (GPU), a processor core, a multi-core processor, a multiprocessor, an application-specific integrated circuit (ASIC), a field programmable gate array (FPGA), a neural processing unit (NPU), and the like.

The processor 510 may control the rendering apparatus 500 by executing functions and instructions to be executed by the rendering apparatus 500. The processor 510 may control the rendering apparatus 500 to execute any one or any combination of the operations and functions described above with reference to FIGS. 1A through 3B.

Under the control of the processor 510, the rendering apparatus 500 may perform a first rendering based on input elements of an input scene, perform a second rendering by inputting a result of the first rendering to a generative model, and generate an output image based on the result of the first rendering and a result of the second rendering.

Figure 6:
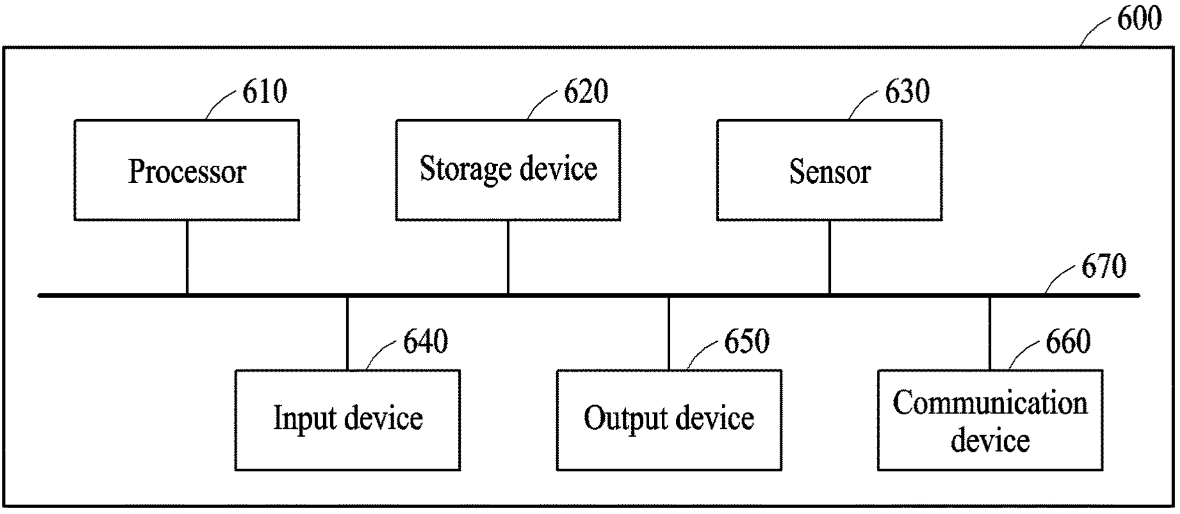
FIG. 6 illustrates an example of a configuration of an electronic device, according to one or more embodiments.

FIG. 6 illustrates an example of a configuration of an electronic device.

Referring to FIG. 6, an electronic device 600 may generate reconstructed image data and provide the generated reconstructed image data to a user. The electronic device 600 may include the above-described rendering apparatus (e.g., the rendering apparatus 250 of FIG. 2B or the rendering apparatus 500 of FIG. 5).

The electronic device 600 may correspond to a computing device, an image acquisition device, or a display device. For example, the electronic device 600 may correspond to devices in various fields, such as a PC, an advanced drivers assistance system (ADAS), a head-up display (HUD), a camera, a three-dimensional (3D) digital information display (DID), a navigation device, a neuromorphic device, a 3D mobile device, a smartphone, a smart TV, a smart vehicle, an Internet of things (IoT) device, a medical device, and the like. Here, the 3D mobile device may include a display device for displaying AR, virtual reality (VR), and/or mixed reality (MR), a face-mounted display (FMD), AR glasses, and the like.

The electronic device 600 may include a processor 610, a storage device 620, a sensor 630, an input device 640, an output device 650, and a communication device 660. Components of the electronic device 600 may communicate with each other via a communication bus 670.

The processor 610 may control overall operations of the electronic device 600, and may execute functions and instructions to be executed within the electronic device 600. The processor 610 may perform one or more operations described above with reference to FIGS. 1A through 5. Under the control of the processor 610, the electronic device 600 may perform a first rendering based on input elements of an input scene, perform a second rendering by inputting a result of the first rendering to a generative model, and generate an output image based on the result of the first rendering and a result of the second rendering.

The storage device 620 may store information used by the processor 610 to perform an operation. For example, the storage device 620 may store instructions to be executed by the processor 610, and may store related information while software or a program is executed in the electronic device 600. The storage device 620 may include, as a memory, a RAM, a DRAM, a SRAM, or other forms of nonvolatile memories known in the art. In addition, the storage device 620 may include non-transitory computer-readable storage media or non-transitory computer-readable storage devices such as storages, magnetic hard disks, optical disks, flash memory devices, and the like. The storage device 620 may store a generative model that is based on a pre-trained ANN.

The sensor 630 may include an image acquisition device that acquires image data, a motion sensor, and the like. The image acquisition device may acquire input image data and transmit the acquired input image data to the processor 610.

The input device 640 may receive user input from a user. The input device 640 may include, for example, a keyboard, a mouse, a touch screen, a microphone, or other devices that detect the user input from the user and transfer the detected user input to the electronic device 600.

The output device 650 may provide an output of the electronic device 600 to the user through a visual, auditory, or tactile channel. The output device 650 may include, for example, a display, a touch screen, a speaker, a vibration generator, or other devices that provide the output to the user. The display may visualize and represent reconstructed image data generated by the processor 610.

The communication device 660 may communicate with an external device through a wired network and/or a wireless network.

The rendering system, training apparatus, rendering apparatus, training apparatus 200, rendering apparatus 250, 500, processors 510, electronic device 600, processor 610, storage device 620, sensor 630, input device 640, output device 650, and communication device 660 memory 520 in FIGS. 1-6 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-6 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method, comprising:

generating a first rendered complete image of a scene from a viewpoint and view direction by applying input elements representing the scene to a computation-based rendering algorithm that generates the first rendered image of the scene from the viewpoint and view direction to include direct illumination of the scene according to the input elements;

generating a second rendered image of the scene from the viewpoint and the view direction by inputting the first rendered image to a generative machine learning model that is based on an artificial neural network (ANN), the generative machine learning model generating the second rendered image to include estimated indirect illumination of the first rendered image by performing inference on the first rendered complete image of the scene; and generating a rendered output image of the scene based on combining the first rendered image that includes the direct lighting and the second rendered image that includes the estimated indirect illumination.

2. The method of claim 1, wherein the input elements comprise any one or any combination of any two or more of lighting information, geometric information, and texture information of the scene.

3. The method of claim 1, wherein the input elements comprise at least texture information, and wherein the generating of the second rendered image comprises:

generating feature embedding on the texture information for each segment;

adding the feature embedding as a condition for the generative machine learning model; and generating the second rendered image by inputting the first rendered image to the generative machine learning model including the condition.

4. The method of claim 1, wherein the generating of the first rendered image comprises generating the first rendered image based on a predetermined rendering equation.

5. The method of claim 1, wherein the generating of the first rendered image comprises generating the direct illumination and generating indirect illumination based on the input elements.

6. The method of claim 1, wherein the combining the first rendered image and the second rendered image comprises adding the first rendered image to the second rendered image.

7. The method of claim 1, wherein the generative machine learning model includes plural layers and an attention mechanism.

8. A non-transitory computer-readable storage medium storing instructions that, when executed by a processor, cause the processor to perform the method of claim 1.

9. The method of claim 1, wherein the combining comprises adding the second rendered image, as a residual, to the first rendered image.

10. The method of claim 1, wherein the generative machine learning model is a trained generative machine learning model.

11. The method of claim 1, wherein the first rendered image is generated by only one iteration of the computation-based rendering.

12. A processor-implemented method, comprising:

generating a first rendered complete image of a scene from a viewpoint and view direction by applying input elements representing the scene to a computation-based rendering algorithm that generates the first rendered image of the scene to include direct illumination of the scene according to the input elements, the generated first rendered image not including indirect illumination of the scene;

generating a second rendered image of the scene from the viewpoint and view direction by inputting the first rendered image to a generative machine learning model that generates the second rendered image to include estimated indirect illumination of the first rendered image by performing inference on the first rendered complete image of the scene;

generating a rendered output image of the scene based on a combination of the first rendered image and the second rendered image;

determining a difference, between the rendered output image and a ground truth image corresponding to the first rendered image, by inputting the rendered output image and the ground truth image to a discriminator model; and training the generative machine learning model to minimize the difference.

13. The method of claim 12, further comprising: training the discriminator model to discriminate between the rendered output image and the ground truth image.

14. The method of claim 12, wherein the ground truth image comprises either one or both of a full rendering image corresponding to the first rendered image and a natural image.

15. An electronic device, comprising:

one or more processors configured to:

generate a first rendered complete image of a scene from a viewpoint and view direction by applying input elements representing the scene to a computation-based rendering algorithm, the first rendered image from the viewpoint and view direction including direct illumination of the scene;

generate a second rendered image of the scene from the viewpoint and the view direction by a generative machine learning model, the second rendered image including indirect illumination of the scene inferred by the generative machine learning model based on the first rendered image by performing inference on the first rendered complete image of the scene; and generate a rendered output image of the first scene based on the first rendered image and the second rendered image.

16. The electronic device of claim 15, further comprising a memory configured to store the generative machine learning model and instructions that when executed by the processor configure the one or more processors to perform:

the generation of the first rendered image;

the generation of the second rendered image; and the generation of the rendered output image.

17. The electronic device of claim 15, wherein the input elements comprise texture information of the input scene, or the texture information and any one or both of lighting information and geometric information of the input scene, and wherein the one or more processors are further configured to:

generate feature embedding on the texture information for each segment;

include the feature embedding as a condition for the generative machine learning model; and generate the second rendered image by inputting the first rendered image to the generative machine learning model including the condition.

18. The electronic device of claim 15, wherein the one or more processors are further configured to:

generate the first rendered image to include indirect illumination rendering based on the input elements.

19. An apparatus, comprising:

one or more processors configured to:

generate a second rendered complete image of a scene from a viewpoint and view direction using a generative neural network model that infers the second rendered image from a first rendered image of the scene that has been generated by computation-based rendering based on input elements representing the scene and based on the viewpoint and view direction, wherein the first image includes direct illumination of the scene according to the input elements representing the scene, and wherein the second rendered image is generated to include estimated indirect illumination of the first rendered image of the scene;

determine a rendered output image of the scene from the viewpoint and the view direction by combining the first rendered image that includes the direct illumination and the second rendered image that includes the indirect illumination;

discriminate a difference between the rendered output image and a ground truth image corresponding to the first rendered image; and train the generative neural network model toward reducing the difference.

20. The apparatus of claim 19, wherein the training of the generative neural network model, to minimize the difference, is based on an output of a discriminator model that performs the difference, and wherein the one or more processors are further configured to train the discriminator model to discriminate between the rendered output image and the ground truth image.

* * * * *